United States Patent Office 3,538,165
Patented Nov. 3, 1970

3,538,165
CONTINUOUS OXIDATION OF AROMATIC COMPOUNDS
Samuel J. Kahn, Rutherford, N.J., assignor to Universal Oil Products Company, Des Plaines, Ill., a corporation of Delaware
No Drawing. Filed July 1, 1968, Ser. No. 741,316
Int. Cl. C07c 47/54
U.S. Cl. 260—599        12 Claims

ABSTRACT OF THE DISCLOSURE

A continuous process for the oxidation of an aromatic compound with oxygen in a reaction zone in contact with a steam purge to continuously remove reaction products from said zone. Water is separated from the reaction products and preferably is reused as a source of steam for the purging. Additional aromatic compound to be oxidized is introduced continuously to the reaction zone.

BACKGROUND OF THE INVENTION

The oxidation of specific aromatic compounds is well known. However, such oxidation has heretofore been conducted in batch type operations which, in addition to the inherent disadvantages of batch type operation, also suffers from comparatively low yields of desired product and excessive production of side products.

DESCRIPTION OF THE INVENTION

The present invention provides a novel process for the oxidation of aromatic compounds which avoids many of the objections of the batch operation. The present invention provides a series of interrelated and mutually cooperative steps for the oxidation of the aromatic compound in a continuous and improved manner. The oxidation is effected in contact with a steam purge to continuously remove reaction products as they are formed and this minimizes overoxidation of the desired product to undesired by-products. Water is separated from the reaction products and the water thus separated preferably is reused as a source of steam for such purging. The reuse of this water avoids loss of oxidation products which may be dissolved or entrained in the water. Additional fresh aromatic compound is continuously supplied to the system in substantially the same rate at which the reaction products are withdrawn, thus providing a truly continuous process of balanced operation.

In one embodiment the present invention relates to a continuous process for the oxidation of an aromatic compound with an oxygen-containing gas, which comprises effecting said oxidation in a reaction zone in contact with a steam purge to continuously remove a major portion of the reaction products from said zone, withdrawing the same from the reaction zone and introducing additional aromatic compound and oxygen-containing gas to said reaction zone.

In a specific embodiment the present invention relates to a continuous process for the oxidation of an aromatic compound with air, which comprises effecting said oxidation in contact with a catalyst and a steam purge to continuously remove a major portion of the reaction products from said zone, condensing the thus removed reaction products and separating water therefrom, utilizing at least a portion of said water as a source of steam for the purging of reaction products, and continuously introducing additional aromatic compound and air to said reaction zone.

From the hereinbefore description, it will be seen that the present invention provides a novel and improved process for the oxidation of aromatic compounds. This improved method may be used for the oxidation of any aromatic compound and is of particular advantage for use in the preparation of aromatic aldehydes, ketones and phenols.

In one embodiment the aromatic compound to be oxidized may be illustrated by the following formula:

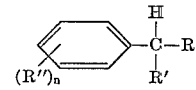

where R is hydrocarbyl or hydrocarbyloxy, R' is hydrogen, hydrocarbyl or hydrocarbyloxy and R" is independently selected from hydrogen, hydrocarbyl, hydrocarbyloxy or halogen and $n$ is 1 or 2. Where R is hydrocarbyloxy, it is selected from alkoxy, aralkoxy, aryloxy, alkylaryloxy, cycloalkoxy and alkylcycloalkoxy. Where R is hydrocarbyl, it is selected from aliphatic arylaliphatic, aryl and cycloaliphatic. Where R' and/or R" are hydrocarbyl or hydrocarbyloxy, these will be selected from those hereinbefore set forth. When R" is halogen, it will be selected from bromine, iodine, fluorine and chlorine. It is understood that R' and R", when hydrocarbyl or hydrocarbyloxy, also may contain one or more substituents attached thereto, the substituents being selected from hydrocarbyl, hydrocarbyloxy or halogen as hereinabove defined.

Where R in the above formula is hydrocarbyloxy, a preferred embodiment of the invention is illustrated by the oxidation of dibenzyl ether to produce increased yields of benzaldehyde. Dibenzyl ether is inherently formed as a byproduct in the manufacture of benzyl alcohol and presently dibenzyl ether is of low industrial value. On the other hand, benzaldehyde is in high demand commercially for use in the manufacture of dyes, perfumes and drugs. As will be hereinafter illustrated, the novel continuous process of the present invention produces high yields of benzaldehyde from dibenzyl ether.

Another embodiment of the invention in which R is hydrocarbyloxy includes the oxidation of dibenzyl acetal of benzaldehyde to produce benzaldehyde. Other illustrations in this embodiment include the oxidation of benzyl alkyl ethers as, for example, the oxidation of benzyl isopropyl ether to benzaldehyde and acetone or the oxidation of benzyl-2-pentyl ether to benzaldehyde and pentanone-2. In place of the isopropyl or pentyl derivatives, it is understood that other alkyl or alkylene benzyl ethers may be employed, the aliphatic moiety containing from 1 to 20 carbon atoms.

The above examples include those in which R" is hydrogen. Illustrative examples in which R" is hydrocarbyl include the oxidation of p-tert-butylbenzyl isopropyl ether to p-tert-butylbenzaldehyde and acetone or the oxidation of p-methylbenzyl-2-butyl ether to p-methylbenzaldehyde and butanone-2. Where R" is hydrocarbyloxy, illustrative examples are the oxidation of p-methoxybenzyl isopropyl ether to anisic aldehyde and acetone or the oxidation of p-methoxybenzyl-2-pentyl ether to anisic aldehyde and pentanone-2. It is understood that the alkoxy moiety may contain from 1 to 10 carbon atoms.

Where R in the above formula is hydrocarbyl, an illustrative example is the oxidation of 1,2-diphenylethane to benzaldehyde. Another illustrative example is the oxidation of alpha-methyldiphenylmethane to acetophenone and phenol. When R" is alkoxy, an illustrative example is the oxidation of p-methoxy-alpha-methyldiphenylmethane to acetophenone and p-hydroxy anisole. When R" is halogen, an illustrative example is the oxidation of p,p'-dibromo-1,2-diphenylethane to p-bromo-benzaldehyde.

The above specific examples are for illustrative purposes only and not intended as limiting. It is understood that any suitable aromatic compound may serve as the charge for oxidation in the novel process of the present invention.

Any suitable oxygen-containing gas is used in the process of the present invention. Conveniently, air is generally employed, although it is understood that free oxygen or any other suitable oxygen-containing gas may be used. The oxygen-containing gas may be used in at least stoichiometric proportions, which will depend upon the particular aromatic compound being subject to conversion. Generally, a slight excess of oxygen will be employed, which may range up to 2 or 3 mole proportions above the stoichiometric requirements. However, it generally is not desirable to use too large an excess of oxygen in order to avoid excessive oxidation.

While the novel features of the present invention may be used for effecting the oxidation in the absence of a catalyst, important advantages are obtained when a catalyst is used. Any suitable oxidation catalyst may be employed and preferably comprises a salt of cobalt, copper, manganese, etc. Particularly preferred salts are the aliphatic, aromatic or naphthenic carboxylic acid salts. The aliphatic carboxylic acid salts are conveniently derived from fatty acids and thus include the caproates, caprylates, capricates, laurates, myristates, palmitates, stearates, etc. Some of these salts, as well as the aromatic and naphthenic acid salts, are available commercially or they may be prepared in any suitable manner. These salts are used in catalytic amounts and the available data indicate that one pound of catalyst is satisfactory for treating over 1,500 pounds of aromatic compound to be oxidized. Even at the end of the continuous run to be hereinafter described, the catalyst still appeared active and could be reused in the process. As will be shown by the following examples, the catalyst appears to increase the activity of the oxygen and also to decrease the production of undesired by-products. Still other salts are the aliphatic, aromatic or naphthenic carboxylic acid salts of rhenium, iron, nickel, ruthenium, rhodium, palladium, platinum, silver, gold, zinc, cadmium, mercury, zirconium, cerium, etc.

In still another embodiment, the catalyst is a well-known free radical promoter. Generally, any peroxy compound that can form free radicals which, in turn, initiate and promote the desirable reaction would be suitable. In one embodiment, the free radical promoter is a hydroperoxide of the formula:

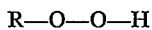

R—O—O—H where R can be alkyl, aromatic or cycloaliphatic radical of up to 20 carbon atoms. Typical examples would be tert-butyl hydroperoxide, 1,1,3,3-tetramethyl butyl hydroperoxide, p-methyl-alpha-methyl benzyl hydroperoxide, etc.

In another embodiment the catalyst is a dihydrocarbyl peroxide of the formula:

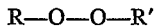

R—O—O—R' where R and R' can be alkyl, aromatic or cycloaliphatic radical of up to 20 carbon atoms. Examples are di-tert-butyl peroxide, 2,5-dimethyl-2,5-bis-(tert-butylperoxy)-hexane, dicumylperoxide, etc.

Additional peroxy compounds include the various peroxy anhydrides such as decanoyl, pelargonyl, propionyl and lauroyl peroxides. Still other catalysts are represented by 2,2'-azobis hydrocarbyl nitriles such as 2,2'-azobis-(2-methyl propionitrile), Fenton's reagent, iodine, etc.

It is understood that the different catalysts which may be used are not necessarily equivalent and that the particular catalyst to be used will be selected with reference to the specific aromatic compound to be charged to the process.

The oxidation is effected at any suitable temperature and pressure. The temperature will be in excess of 100° C. and generally within the range of from 150 to 200° C., although a higher temperature up to 250° C. may be used in some cases. Any suitable pressure is employed and may range from subatmospheric to 200 pounds per square inch or more.

The process is effected in any suitable flow system and generally will comprise a reaction zone equipped with inlet and outlet lines and preferably with suitable mixing means such as mixing paddles, blades, etc. in order to insure intimate contact of the aromatic compound and oxidizing gas. When desired, a reflux condenser may be positioned above the reaction zone in order to return the unconverted aromatic compound back to the reaction zone. In still another embodiment, the reaction zone may comprise a rotating autoclave or the like. The air or other oxidizing gas is supplied from any suitable source to the reaction zone, preferably at a lower portion thereof so that the oxygen also serves to effect mixing of the reaction mixture. The system also includes a steam generator of any suitable design and the steam also preferably is introduced into the lower portion of the reaction zone to serve as a purge of the reaction products being formed therein. The reaction zone also may be provided with suitable heating means to maintain the reaction zone at the desired temperature.

The amount of steam supplied to the reaction zone will be sufficient to purge the desired reaction products being formed in the reaction zone. The steam preferably is used in a weight ratio to aromatic compound charge of from 1 to 3 and still more preferably of from 1.5 to 2 weights of steam per weight of aromatic compound. An excess of steam appears to reduce the rate of reaction and, therefore, should generally not be used. Lesser amounts of steam appear to increase overoxidation to undesired products and, accordingly, also generally should not be used.

The reaction products are withdrawn from the upper portion of the reaction zone, condensed in suitable cooling means and collected in a suitable receiver. As hereinbefore set forth, the effluent from the reaction will include the water resulting from the steam purge and, as a preferred feature of the present invention, the water may be separated from the reaction products and reused as a source of steam for the purging of reaction products. The reuse of the water from this source reduces the loss of reaction products dissolved or entrained in the water. In this manner the reaction products are returned to the reaction zone and eventually are recovered as products of the process. While it is preferred to recycle the water directly, it is understood that the water may be sent to a separate system to recover dissolved or entrained organic compounds by solvent extraction or otherwise and the water then may be recycled to the process if desired or the water may be otherwise disposed of. In any event, after separation of the water, the reaction product generally is alkali extracted and then fractionated to recover the desired products therefrom.

From the above description it will be seen that the present invention provides a novel process for effecting improved oxidation, with increased yields of the desired product and reduced yields of undesired by-products.

The following examples are introduced to illustrate further the novelty and utility of the present invention but not with the intention of unduly limiting the same.

EXAMPLE I

This example describes the continuous oxidation of dibenzyl ether. The process was effected in a flow system substantially as hereinbefore described and was continued for a period of 54 hours, starting with a charge of 500 grams of dibenzyl ether and 2 grams of cobalt naphthenate, more specifically the cobalt salt of cyclohexylcarboxylic acid. The air was charged to the reaction zone at a rate of 750 cc. per minute. Steam was continuously passed into the lower portion of the reaction zone in a weight proportion of from 1.3 to 2.6 weights of steam per weight of aromatic compound fed into the reaction zone. A total of 5271 grams of stream (measured as liquid $H_2O$) was charged during this period. Additional dibenzyl ether was added continuously during the run to a total amount of 3300 grams. The reaction zone was maintained at an internal temperature from about 175° to about 186° C. and the reaction mixture was vigorously stirred by mixing blades.

In an operation as above described, the overall yield on an analytical basis was 70.8% of benzaldehyde, 12.6% benzyl alcohol, 8.0% benzylbenzoate, 8.2% benzoic acid and 1.7% toluene. These yields are percents of theory of the main products formed based on the moles of dibenzyl ether charge consumed in the reaction. The water separated from the receiver is continuously recycled to the steam generator which, as hereinbefore set forth, serves to recover dissolved or entrained oxidation products.

EXAMPLE II

Another run was made in substantially the same manner as described in Example I except that the catalyst used in this example was cobalt octoate and more specifically cobalt-2-ethylhexoate and contained 6% by weight of cobalt. This run was continued for a total of 16.5 hours, with the temperature in the reaction zone ranging from 183 to 195° C. A total of 900 grams of dibenzyl ether was added during the run. Similarly, a total of 1755 grams of steam (measured as liquid $H_2O$) was charged to the reactor. The overall yield of benzaldehyde was 68.3% of theory. The other products were 11.7% benzyl alcohol, 8.1% benzyl benzoate, 5.8% benzoic acid and 3.2% toluene.

EXAMPLE III

For comparative purposes, another run was made in the absence of a catalyst. This run was made in substantially the same manner as described in the preceding examples except that no catalyst was used. The run was continued for a total of 14.33 hours, with the temperature in the reaction zone ranging from 183° to 190° C. In addition to the original charge of 500 grams of dibenzyl ether, a total of 980 grams of dibenzyl ether was added during the run. Similarly, a total of 1340 grams of steam (measured as liquid $H_2O$) was charged to the reactor. In this run the overall yield of benzaldehyde was 58.3% by weight. The other products included 10% benzyl alcohol, 14.7% benzyl benzoate, 8.5% benzoic acid and 11% toluene.

It will be noted that the yield of benzaldehyde is lower and the formation of toluene and benzyl benzoate are higher in the absence of a catalyst in comparison to the yields obtained in the presence of the catalyst as reported in the preceding examples. Accordingly, it is definitely preferred that the oxidation be effected in the presence of the catalyst.

EXAMPLE IV

The improved results obtained by the continuous process of the present invention may be compared with reported results of a non-catalytic batch type operation carried out with no steam purge for the oxidation of dibenzyl ether to benzaldehyde. The batch system is conducted at a temperature of 180–190° C. until all of the dibenzyl ether is reacted. In the batch type operation the overall yields are 44% benzaldehyde, 1.3% benzyl alcohol, 25.5% benzyl benzoate, 11.2% benzoic acid and 3.8% toluene. When comparing these results with those reported in Examples I and II, it will be seen that the continuous process utilizing the steam purge produces much higher yields of benzaldehyde, considerably lower yields of benzyl benzoate and lower yields of benzoic acid.

EXAMPLE V

This example illustrates the preparation of p-tert-butyl benzaldehyde and acetone by the oxidation of p-tert-butylbenzyl isopropyl ether. The oxidation is effected in a continuous manner as hereinbefore described at a temperature of 180–185° C. using cobaltous naphthenate as the catalyst. Water is separated from the reaction products and the thus separated water is used to generate steam which is supplied to the lower portion of the reaction zone and serves to purge the reaction products therefrom. This process produces improved yields of p-tert-butyl benzaldehyde and acetone.

EXAMPLE VI

This example illustrates the preparation of anisicaldehyde and pentanone-2 by the catalytic oxidation of p-methoxybenzyl-2-pentyl ether. The oxidation is effected in substantially the same manner as hereinbefore described, utilizing the water recovered from the reaction products to serve as the source of steam, and the continuous introduction of charge to the process. The oxidation is effected at a temperature of about 175° C. in the presence of copper palmitate catalyst. Following completion of the reaction, the bottoms remaining in the reaction zone are extracted with potassium carbonate to remove acidic material and the remaining products are combined with the reaction products collected in the receiver and subjected to fractionation to recover anisic aldehyde and pentanone-2 as the primary products of the process.

EXAMPLE VII

This example illustrates the oxidation of p-methoxy-alpha-methyldiphenylmethane to acetophenone and p-hydroxyanisole. The reaction is effected in the continuous manner hereinbefore described, utilizing the water recovered from the reaction products as the source for the steam for purging and with the continuous introduction of charge to balance the reaction products being purged from the reaction zone. The oxidation is effected at a temperature of about 120° C. utilizing di-tert-butylperoxide catalyst. The bottoms from the reaction zone are drained therefrom intermittently, and combined with the reaction products withdrawn from the receiver after separation of water therefrom. The mixture is subject to fractionation to recover the acetophenone and p-hydroxyanisole as the primary products of the process.

EXAMPLE VIII

Diphenylethane was subjected to continuous oxidation with air in substantially the same manner as described in Example II. The charge was 1,2-diphenylethane, 500 grams being initially introduced into the reaction zone, and the catalyst was cobalt octoate. This run continued for 11.5 hours, with the temperature in the reaction zone ranging from 180–210° C. A total of 1320 grams of diphenylethane was added during the run. Similarly, a total of 1328 grams of steam (measured as liquid $H_2O$) was charged to the reactor. The overall yield of benzaldehyde was 59.8% of theory. The other products were 15.2% benzyl alcohol, 7.3% benzoic acid and 4.9% toluene.

I claim as my invention:

1. A continuous process for the oxidation of an aromatic compound having the formula

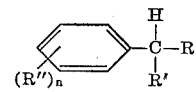

where R is selected from the group consisting of alkoxy, benzyloxy, and benzyl; R' is hydrogen or alkyl; R" is hydrogen, halogen, alkyl or alkoxy; and $n$ is 1 or 2, which process comprises reacting said aromatic compound with a free-oxygen-containing gas in a reaction zone in contact with a steam purge which is passed through said reaction zone to continuously remove a major portion of the reaction products from said zone, withdrawing the same from the reaction zone, and continuously introducing additional aromatic compound and free oxygen-containing gas to said zone at substantially the same rate at which the reaction products are withdrawn therefrom.

2. The process of claim 1 wherein the withdrawn reaction products are condensed and water is separated therefrom, at least a portion of said water being utilized as a source of steam for the purging of the reaction products.

3. The process of claim 1 effected in the presence of an oxidation catalyst.

4. The process of claim 3 wherein said oxidation catalyst is a fatty acid salt or naphthenic carboxylic acid salt of cobalt, copper or manganese.

5. The process of claim 3 wherein said oxidation catalyst is a hydroperoxide.

6. The process of claim 1 wherein said aromatic compound is dibenzyl ether, the catalyst is cobalt naphthenate and the primary product of the process is benzaldehyde.

7. The process of claim 1 wherein said aromatic compound is dibenzyl ether, the catalyst is cobalt octoate and the primary product of the process is benzaldehyde.

8. The process of claim 1 wherein said aromatic compound is alklybenzyl alkyl ether.

9. The process of claim 1 wherein said aromatic compound is alkoxybenzyl alkyl ether.

10. The process of claim 1 wherein said aromatic compound is 1,2-diphenylethane.

11. The process of claim 2 effected at a temperature of from about 100° to about 200° C.

12. The process of claim 2 in which said steam purge is effected using a weight ratio of steam (measured as liquid $H_2O$) to aromatic compound charge of from 1 to 3:1.

References Cited

UNITED STATES PATENTS

| | | | |
|---|---|---|---|
| 1,636,855 | 7/1927 | Craver | 260—599 |
| 2,444,816 | 7/1948 | Emerson et al. | 260—592 |
| 2,497,889 | 2/1950 | Hull | 260—540 |
| 2,545,870 | 3/1951 | Baker et al. | 260—592 |
| 2,561,350 | 7/1951 | Eichel | 260—476 |
| 2,686,813 | 8/1954 | Peters | 260—592 |

OTHER REFERENCES

Cooper et al., Chemical Abstracts 67, 10939K (1967).
Russell et al., J. Am. Chem. Soc. 86, 2357–2367 (1964).

DANIEL D. HORWITZ, Primary Examiner

U.S. Cl. X.R.

260—476, 523, 592, 593, 600, 612, 617, 668